(12) United States Patent
Wihinen et al.

(10) Patent No.: US 8,646,826 B2
(45) Date of Patent: Feb. 11, 2014

(54) UTILITY VEHICLE DRIVER'S STATION

(75) Inventors: Kimmo Wihinen, Laukaa (FI); Matti Makkonen, Turku (FI)

(73) Assignee: Valtra Oy AB, Suolahti (FI)

( * ) Notice: Subject to any disclaimer, the term of this patent is extended or adjusted under 35 U.S.C. 154(b) by 0 days.

(21) Appl. No.: 13/310,061

(22) Filed: Dec. 2, 2011

(65) Prior Publication Data

US 2012/0193930 A1    Aug. 2, 2012

(30) Foreign Application Priority Data

Dec. 3, 2010 (GB) ................................. 1020499

(51) Int. Cl.
B62D 33/06         (2006.01)

(52) U.S. Cl.
USPC ................. 296/71; 296/190.01; 180/89.12

(58) Field of Classification Search
USPC ............................ 296/71, 190.01; 180/89.12
See application file for complete search history.

(56) References Cited

U.S. PATENT DOCUMENTS

| 5,890,397 | A | 4/1999 | Stoner |
| 6,321,960 | B1 | 11/2001 | Ellis |
| 6,612,636 | B2 * | 9/2003 | Arthur et al. ............... 296/71 |
| 7,032,703 | B2 * | 4/2006 | Wulfert et al. ............... 180/329 |
| 8,079,560 | B2 * | 12/2011 | Blackwell ................. 248/229.1 |
| 2004/0016588 | A1 | 1/2004 | Vitale |

FOREIGN PATENT DOCUMENTS

| DE | 9204392 | 5/1992 |
| DE | 102006018537 | 11/2007 |
| GB | 2083914 | 3/1982 |
| JP | 05296779 | 11/1993 |
| WO | 2009050747 | 4/2009 |

OTHER PUBLICATIONS

European Search Report from Application No. EP11190715 Dated Apr. 3, 2012.
UK Search Report for Application No. GB1020499.8 dated Mar. 8, 2011.

* cited by examiner

Primary Examiner — Joseph Pape

(57) ABSTRACT

A driver interface module (14) is fitted inside a utility vehicle cab. The module is located alongside a driver's seat (12), attached thereto, and comprises a console (24) having plurality of driver interface devices disposed thereon. A display attachment bar (26) is mounted to the console, wherein at least one display device (28) is clamped to the display attachment bar.

9 Claims, 1 Drawing Sheet

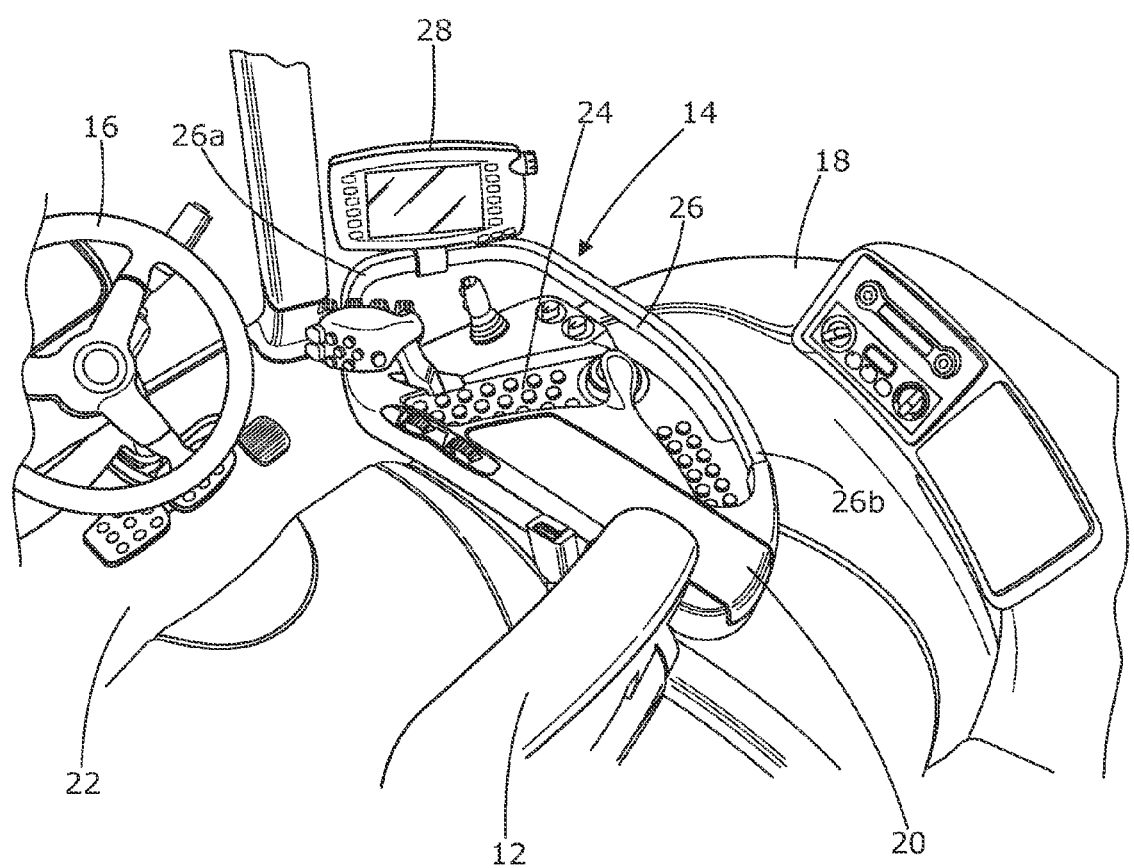

UTILITY VEHICLE DRIVER'S STATION

CROSS-REFERENCE TO RELATED APPLICATION

The present application claims the benefit of and priority from United Kingdom Application No. 1020499.8, filed Dec. 3, 2010, the entire disclosure of which is hereby incorporated by reference.

FIELD OF THE INVENTION

The invention relates to driver interface modules for application in utility vehicle cabs. In particular, but not exclusively so, the invention relates to driver consoles for use in a utility vehicle cab having a rotatable driver station.

BACKGROUND

The basic layout of an agricultural tractor cab has not changed significantly since basic tractors were conceived in the early twentieth century. However, as technology advances, more and more functionality is added to the tractor and with this more and more driver interface devices are required. In fact the development of farm implements, such as seed drills and balers, also drives an increase in the number of interface devices such as displays which must be placed in view and/or reach of the driver.

SUMMARY OF INVENTION

It is an object of the invention to provide a driver interface module which caters for advances in technology, and delivers customization for the user in an ergonomically friendly way.

In accordance with a first aspect of the invention there is provided a driver station fitted inside a utility vehicle cab comprising a driver's seat with a driver interface module mounted thereto, the module located alongside the driver's seat and comprising a console having plurality of driver interface devices disposed thereon and a display attachment bar fixed to the console, wherein at least one display device is clamped to the display attachment bar. The driver interface module is mounted to the seat itself, so that rotational position of the seat has little or no affect on the driver's use of the display devices attached. Advantageously, the display attachment bar allows a user to customize their workstation according to the implement attached, or technology involved.

The invention involves the recognition that different farm implements often require dedicated proprietary devices to be fixed within easy reach of the driver. In many cases it is not practical to fit dedicated display devices for every conceivable implement, as this would clutter the working environment of the driver. Moreover, it is not always possible to provide a common display device for all implements to be used. Currently, this problem is overcome by ad-hoc temporary fixing of display devices within the cab. Such a solution is not only ugly, but presents an inconvenience to the driver.

The provision of a dedicated attachment bar allows the driver simply to attach and detach display devices to cater for the application in hand, and avoid cluttering of the workspace. For example, in one working situation a tractor may be used for baling wherein a proprietary baler terminal is fitted to the attachment bar. In a second working situation, the tractor may be used for planting wherein a pair of dedicated planter monitors are fitted.

The display interface bar preferably has a substantially rectangular cross section, thereby providing strength in construction and a suitable structure for clamps to adhere to thus supporting the display device(s).

Preferably the display attachment bar is mounted to the console at both ends, thereby improving the strength and integrity of the assembly whilst avoiding protruding ends which may cause a hazard to the driver.

The display attachment bar may be bent into a profile which substantially corresponds to the profile of the console. Not only is such an arrangement aesthetically pleasing, but such conformity improves the ergonomics of the driver station and avoids interference with surrounding parts of the cab.

Although the display attachment bar is primarily aimed to support display devices, it is envisaged that other devices may be supported such as cell phone holders or further panels of buttons and switches.

The invention lends itself well to reversible driving stations, or even driver stations having a rotatable seat.

In accordance with a second aspect of the invention there is provided an agricultural tractor comprising a cab having a floor, and a drivers station rotatably mounted to the floor, the driver's station comprising a driver's seat with a driver interface module mounted thereto, the module located alongside the driver's seat and comprising a console having plurality of driver interface devices disposed thereon and a display attachment bar fixed to the console, wherein at least one display device is clamped to the display attachment bar.

BRIEF DESCRIPTION OF THE DRAWINGS

Further advantages of the invention will become apparent from the following description of a specific embodiment, with reference to the appended drawing in which:—

FIG. 1 shows a perspective view of a tractor cab interior, including a driver interface module in accordance with the invention.

DESCRIPTION OF EXAMPLE EMBODIMENT

With reference to FIG. 1, a tractor cab interior comprises a driver's seat 12 having attached to the side thereof a driver interface module 14. For completeness, the tractor cab also includes a steering wheel 16, and a fender 18, which covers a rear wheel of the tractor (not shown).

The interface module 14 in this case replaces the conventional armrest of a driver's seat. An armrest pad 20 is integrated into the module to provide comfort and improved ergonomics for the driver. Although not illustrated in FIG. 1, the seat 12 is rotatably mounted to the cab floor 22 to allow the driver to change the orientation of the seat to cater for different applications. It should be understood that the interface module 14 rotates with the seat 12.

The interface module 14 includes a console 24 which includes various buttons, switches and joysticks to enable the driver to control the various functions of the tractor. Each user interface is connected to an electronic control unit (not shown) via appropriate wiring hidden from view.

The driver interface module 14 has integrated therewith a display attachment bar 26 which is of substantially rectangular section and is mounted to the console 24 at each end. The bar 26 in this case is shaped by bending into a profile which substantially conforms with the profile of the console. Advantageously, the bar 26 does not extend significantly beyond the horizontal envelope of the console 24. In the arrangement shown, the attachment bar 26 comprises a vertical section 26a secured to the console and a horizontal section 26b secured at a rearmost end to the console 24.

The display attachment bar 14 provides a support to which various display devices can be attached by means of a simple clamp or otherwise. FIG. 1 shows an arrangement with a single display device 28 attached to the bar 26 by a clamp 30. It will be recognized that a driver is free to adjust the position of the display device 28 along the length of the attachment bar 26. Moreover, more than one display device can be attached to the bar 26 as required by the specific application in hand.

What is claimed is:

1. A driver station fitted inside a utility vehicle cab comprising a driver's seat with a driver interface module mounted thereto, the module located alongside the driver's seat and comprising a console having plurality of driver interface devices disposed thereon and a display attachment bar fixed to the console, wherein the display attachment bar comprises a first substantially vertical section secured to the console, and a second substantially horizontal section secured to a rearmost end of the console and wherein at least one display device is clamped to the display attachment bar.

2. A driver station according to claim 1, wherein the display attachment bar has a substantially rectangular cross section.

3. A driver station according to claim 1, wherein the display attachment bar is fixed to the console at both ends.

4. A driver station according to claim 1, wherein at least one of a cell phone holder and a driver interface device is detachably attached to the display attachment bar.

5. A driver station according to claim 1, wherein the driver seat is rotatably mounted to a cab floor.

6. An agricultural tractor comprising a cab having a floor, and a drivers station rotatably mounted to the floor, the driver's station comprising a driver's seat with a driver interface module mounted thereto, the module located alongside the driver's seat and comprising a console having plurality of driver interface devices disposed thereon and a display attachment bar fixed to the console, wherein the display attachment bar comprises a first substantially vertical section secured to the console, and a second substantially horizontal section secured to a rearmost end of the console, and wherein at least one display device is clamped to the display attachment bar.

7. An agricultural tractor according to claim 6, wherein the display attachment bar has a substantially rectangular cross section.

8. An agricultural tractor according to claim 6, wherein the display attachment bar is fixed to the console at both ends.

9. An agricultural tractor according to claim 6, wherein at least one of a cell phone holder and a driver interface device is detachably attached to the display attachment bar.

\* \* \* \* \*